United States Patent [19]

Minami et al.

[11] 4,063,710

[45] Dec. 20, 1977

[54] REDUCTION APPARATUS FOR OPENING AND CLOSING A VALVE

[75] Inventors: Toshimi Minami, Osaka; Hidematu Sioda, Hatano, both of Japan

[73] Assignee: Tomoe Technical Research Company, Osaka, Japan

[21] Appl. No.: 686,997

[22] Filed: May 17, 1976

[30] Foreign Application Priority Data

June 13, 1975 Japan .................................. 50-72470

[51] Int. Cl.² ............................................ F16K 31/53
[52] U.S. Cl. ..................................... 251/248; 74/805; 251/288
[58] Field of Search ...................... 251/248, 249, 259.5, 251/305, 306, 308, 285, 288; 74/801, 803, 805, 770, 789

[56] References Cited

U.S. PATENT DOCUMENTS

| | | | |
|---|---|---|---|
| 804,438 | 11/1905 | Simonds | 74/770 |
| 1,984,235 | 12/1934 | Sharpe | 74/789 |
| 2,030,150 | 2/1936 | Mueller | 251/285 |
| 2,043,971 | 6/1936 | Marvin | 251/285 |
| 3,013,447 | 12/1961 | Hils et al. | 74/805 |
| 3,150,544 | 9/1964 | Brass | 74/770 |
| 3,222,954 | 12/1965 | Wuertz | 74/801 |
| 3,425,439 | 2/1969 | Duffey et al. | 251/306 |
| 3,958,465 | 5/1976 | Hiersig et al. | 74/801 |

*Primary Examiner*—Martin P. Schwadron
*Assistant Examiner*—G. L. Walton

[57] ABSTRACT

A reduction apparatus mainly comprises a casing mounted on a valve body, an input shaft, an external gear, an internal gear capable of engaging the external gear, a rotary member connected to the internal gear to transmit the torque from the same to a valve stem, and pin assemblies for preventing the external gear from rotating on its own shaft, while external gear revolves about the other shaft without rotating on its own axis, whereby the internal gear having a slightly larger number of teeth is given rotation due to the difference in number of teeth of both gears, and the rotation of the input shaft is transmitted to the valve stem with its speed reduced.

2 Claims, 5 Drawing Figures

REDUCTION APPARATUS FOR OPENING AND CLOSING A VALVE

The present invention relates to a reduction apparatus for opening and closing a valve in which a valve member rotates about a valve stem acting as a shaft in a valve body, thereby permitting a flow way to be open or closed.

The prior art to which the present invention is directed included the art of butterfly valves being of a type in which a disk-like valve member is rotatable in the valve passage between an open and closed positions. When in the closed position, the valve member engages a valve seat with which it cooperates to provide a seal against leakage of the pressurized line contents intended to be controlled by the valve.

In valves of this type, the valve stem is rotated manually or by means of a motor or the like, and especially as to larger-sized ones the rotational speed of a shaft connected to an output shaft of the motor or to a hand wheel is reduced to transmit its rotation to the valve stem.

Heretofore, a planet gear apparatus has been typically employed as a reduction apparatus for opening and closing a valve. The planet gear apparatus provide the ability of transmitting the rotation of an input shaft to a coaxially aligned output shaft using planet gears. However, the structure of the planet gear apparatus composed of relatively flexible constructions and comprising a number of gears has been such as to prevent opening operation of the valve member due to the restitution force of the valve produced when the valve member is tightly closed, and such planet gears, therefore, are not suitable for driving a valve. Further, the planet gear apparatus, which should be employed for acquiring the high-speed rotation or high accuracy in itself, has been difficult and expensive to manufacture.

It is an important object of the present invention to provide a reduction apparatus for opening and closing a valve in which an external gear is caused to revolve about the other shaft without rotating on its own axis, whereby an internal gear having a slightly larger number of teeth engaged with the external gear is caused to rotate due to the difference in number of the teeth of both gears, so that rotation of the internal gear is transmitted to a valve stem.

It is another object of the present invention to provide a reduction apparatus for opening and closing a valve in which a rotary member for transmitting the torque from an internal gear to a valve stem is provided with at least one projection, and a casing is provided on its inner peripheral surface with two stop members, which stop members are adapted to contact said projection so as to limit the moving range thereof, thereby permitting the valve stem to be rotated only through 60° or 90°.

It is a further object of the present invention to provide a reduction apparatus for opening and closing a valve in which an external gear is provided with through ports one having a radius equal to the total length of the radius of a pin assembly adapted to be inserted into the through port so as to hinder the rotation of the external gear, and the eccentric radius of an eccentric shaft portion of an input shaft.

It is still another object of the present invention to provide a reduction apparatus for opening and closing a valve in which there are provided a pair of input shafts, external and internal gears, a first input shaft providing a revolving motion to a first external gear instead of rotational motion so as to give rotation to a first internal gear, which rotation is transmitted to a second input shaft, which provides a revolving motion to a second external gear instead of rotational motion so as to give rotation to a second internal gear, thereby permitting the rotation of the first input shaft to be transmitted to a rotary member with its speed reduced in the two steps to rotate a valve stem.

It is still another object of the present invention to provide a reduction apparatus for opening and closing a valve in which a first internal gear is integrally formed with a second input shaft, and a casing is provided in the middle with an intermediate wall supporting pin assemblies adapted to hinder the rotation of a second external gear.

The invention will be explained in conjunction with two illustrative embodiments shown in the accompanying drawings, in which.

Figure 1:
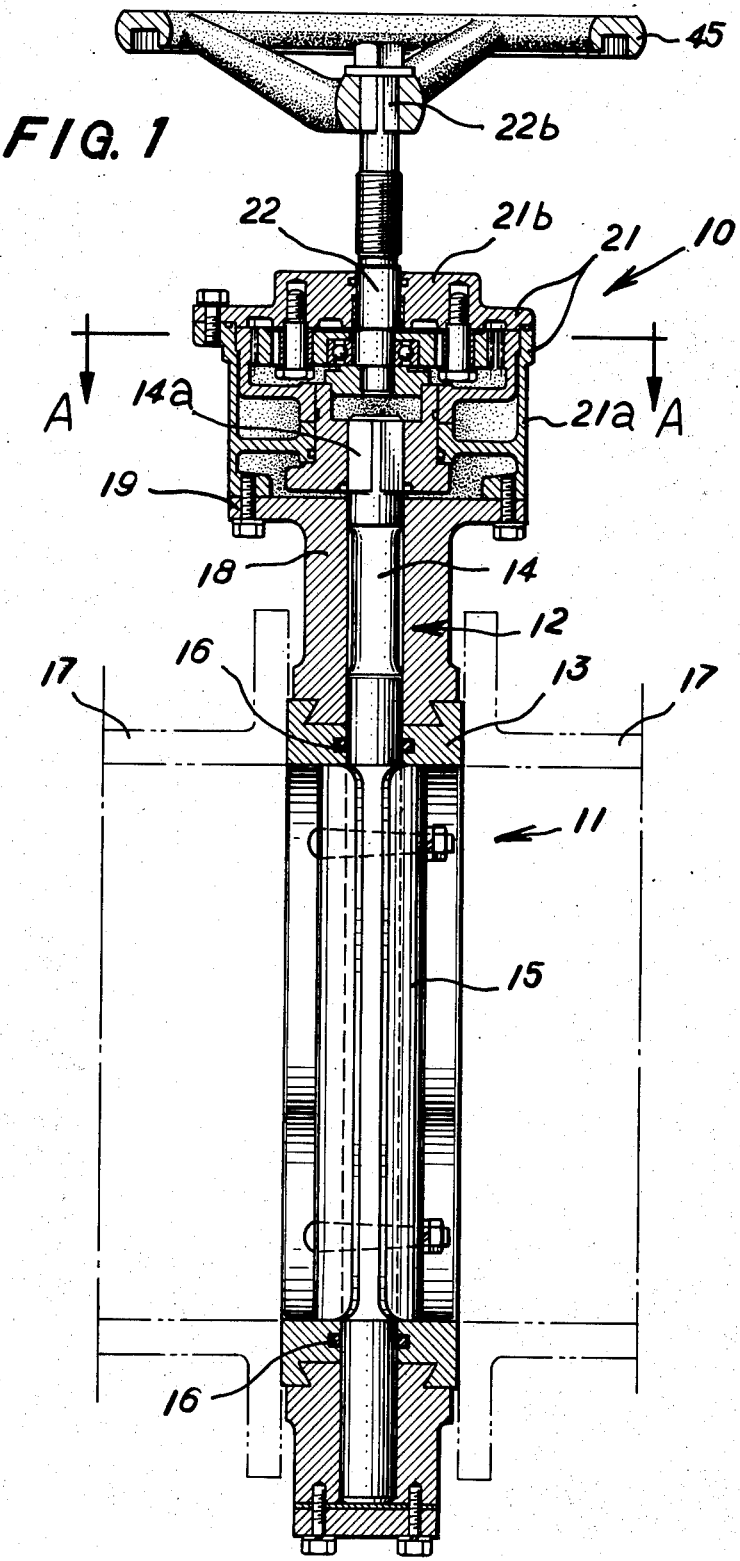
FIG. 1 is a longitudinal sectional view of a first embodiment of a reduction apparatus according to the present invention, installed on a butterfly valve.
Figure 2:
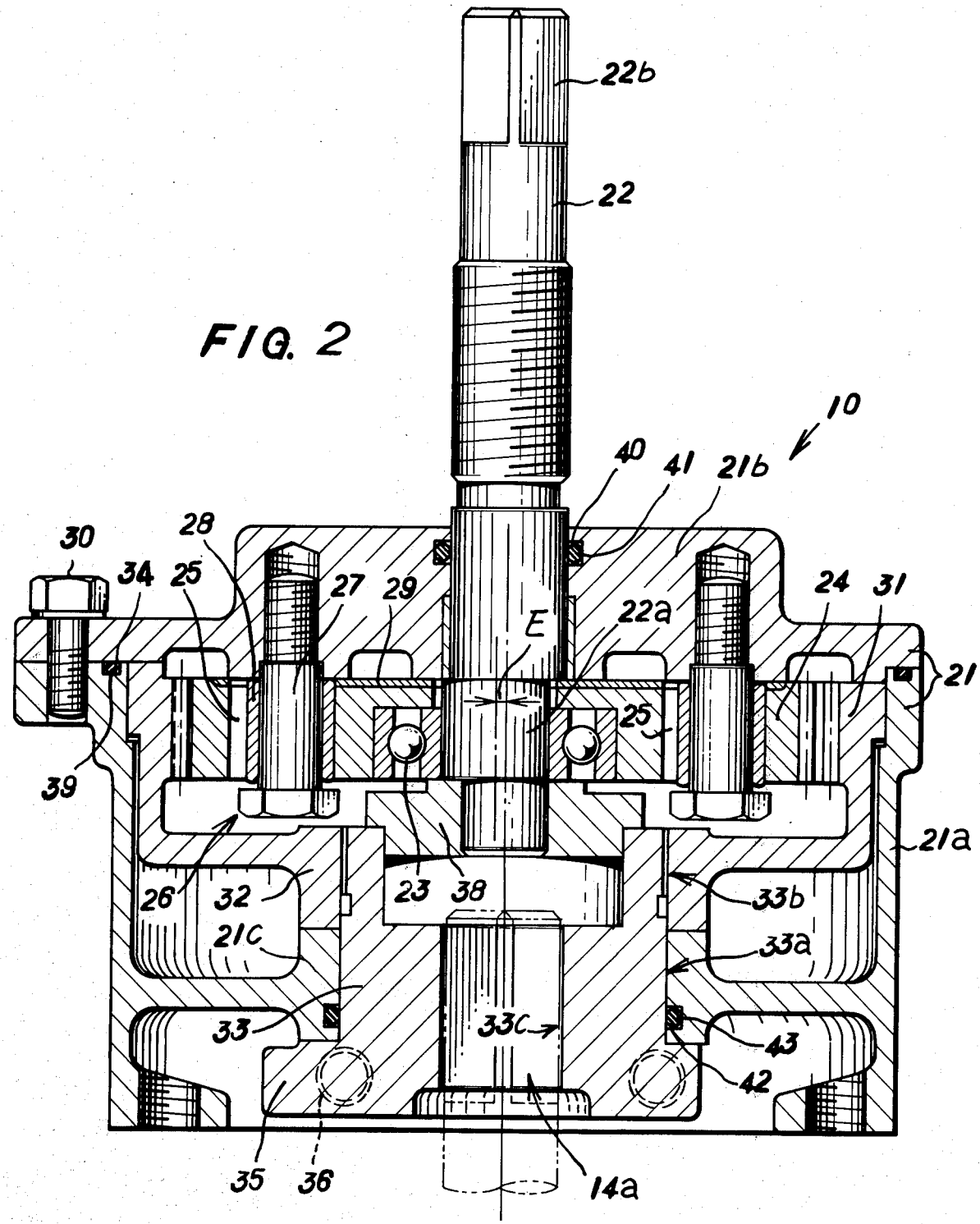
FIG. 2 is an enlarged vertical longitudinal sectional view of the reduction apparatus of FIG. 1.
Figure 3:
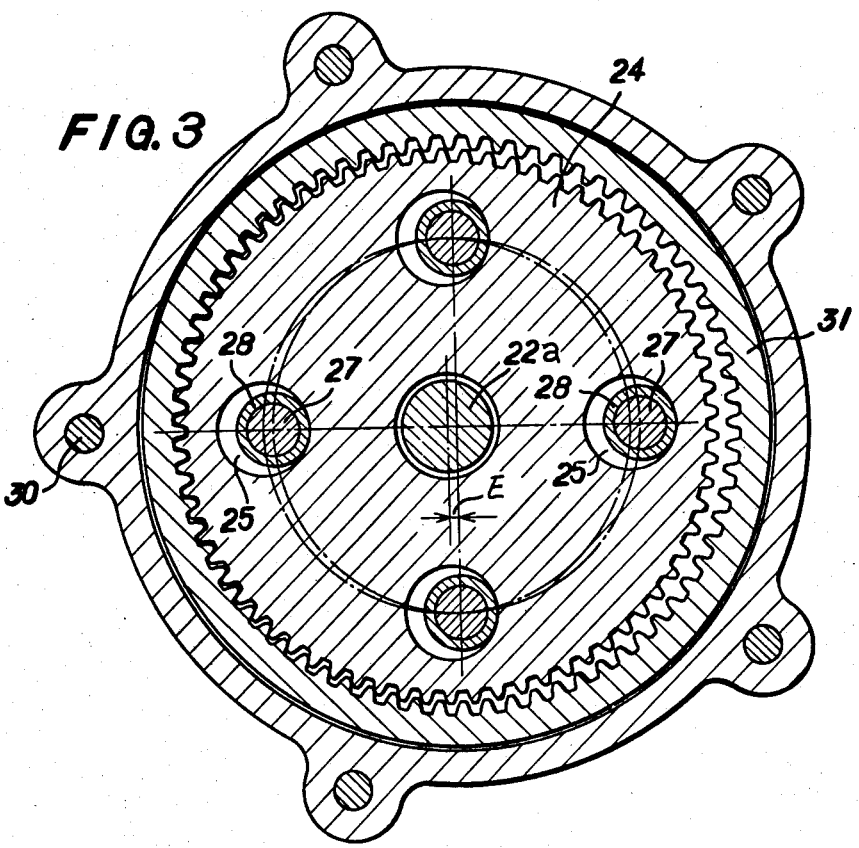
FIG. 3 is a cross-sectional view taken along the line A—A of FIG. 1.
Figure 4:
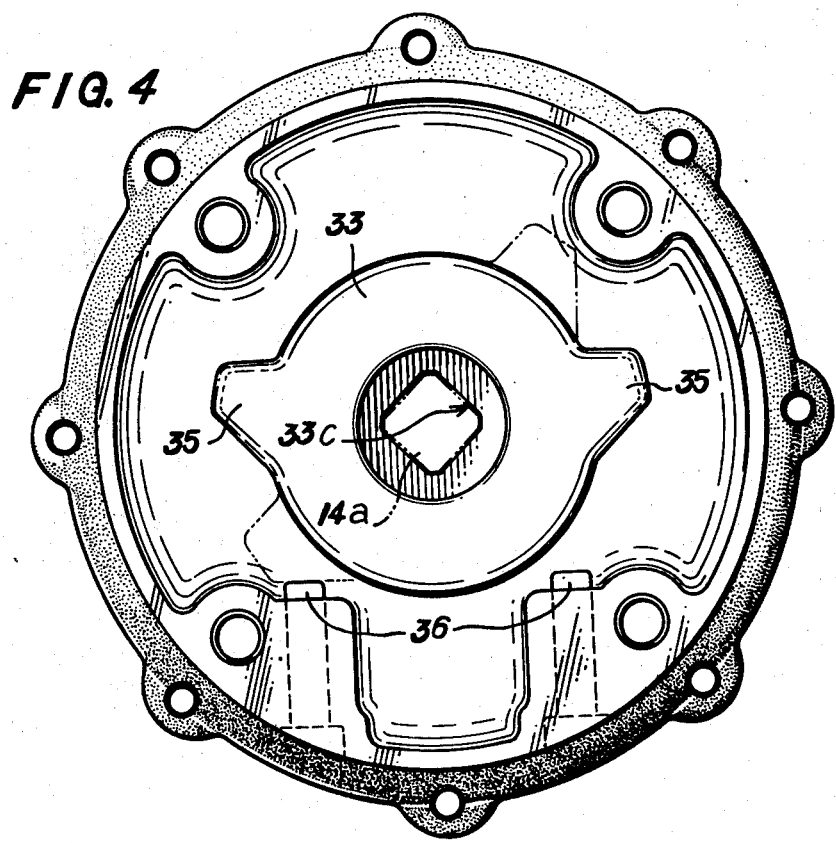
FIG. 4 is a bottom view of the reduction apparatus of FIG. 2.

A reduction apparatus 10 according to the present invention is used only for opening and closing a valve. FIG. 1 shows a sectional view of the reduction apparatus 10 mounted on a butterfly valve 11 which is most suitable for realizing the present invention.

A first embodiment of the present invention will be described in detail with reference to FIGS. 1 to 4. The butterfly valve 11 comprises a valve body 12 forming a valve shell, a valve seat 13 having an annular set and tightly engaged with the inner peripheral surface of the valve body 12, a valve stem 14 passing through the valve body 12 and the valve seat 13 to be rotatably supported thereby one end of the valve stem 14 protruding upwardly beyond the valve body, and a valve member 15 shaped like a disk and mounted on the valve stem 14, and it is disposed between two tubular flange members 17, 17 to control the fluid flow by opening and closing a flowway.

The reduction apparatus 10 includes a casing 21 secured to a flange part 19 of a neck 18 of the valve body 12 by means of bolts. The casing 21 of the reduction apparatus 10 comprises a first casing 21a forming the peripheral surface of the apparatus 10 and a second casing 21b forming the upper surface of the same, said first and second casings being secured to each other with bolts 30. The upper end of the valve stem 14 of the butterfly valve 11 projects into the first casing 21a.

The numeral 22 designates an input shaft of the reduction apparatus 10 passing through the second casing 21b, and including an eccentric shaft portion 22a positioned in the casing 21, said eccentric portion 22a being eccentric by E with respect to the other portion thereof. An external gear 24 is mounted on the eccentric shaft portion 22a of the input shaft 22 through a medium of a guide bearing 23.

The external gear 24 is provided with a plurality (four in FIG. 3, or any even number equal to or more than two) of equally spaced through ports. In each of the through ports is inserted a pin assembly, which comprises a bolt-like pin 27 threadedly fixed to the second casing 21b and a cylindrical member 28 into which is fitted said pin 27 and which is formed from oilless metal or the like to reduce friction between the pin and the external gear 24.

The even-numbered through ports 25 are positioned so as to have one to one correspondence to the pin assemblies 26 of the same number, the radius of each of the through ports 25 being equal to the total length of the radius of each pin assembly 26 i.e., that of the cylindrical member 28, and the eccentric radius E. Said through ports may be replaced by recesses adapted to receive a head of each pin.

The external gear 24, which is mounted through a bearing on the eccentric shaft portion 22a of the input shaft 22, is hindered from rotating on its own axis by means of the pin assemblies 26. However, the external gear 24 is radially movable relatively to the input shaft 22 within a certain range, since the pin assemblies 26 are inserted in the through ports 25 having a larger diameter. In other words, the external gear 24 does not rotate on its own axis, but revolve about the axis of the input shaft with its axis (same as the axis of the eccentric shaft portion 22a) moving along a circular orbit the radius of which is equal to the length of the eccentric radius E. Located between the external gear and the second casing 21b is antifriction plate 29 which serves to reduce friction therebetween.

Outside the external gear 24, there is an internal gear 31 capable of engaging the external gear 24, which is provided with a slightly larger number of teeth than the external gear 24 and is rotatably supported by the inner peripheral surface of the first casing 21a. Further, the internal gear 31 is disposed co-axially with the input shaft 22. The external gear 24 and the internal gear 31 are of the same module, the diameter of the standard pitch circle of the former being smaller than that of the latter. In short, the internal gear and the external gear with a smaller number of teeth are not co-axial, but engaged with each other only in a portion thereof, and the rotation of the input shaft, therefore, allows a position of said engagement of the external gear with the internal gear to continuously shift due to the displacement of the eccentric shaft portion in eccentric direction. However, the internal gear 31 is given rotation at lower angular velocity by the external gear 24 which revolves about the axis of the input shaft since the internal gear 31 is provided with a larger number of teeth.

If the numbers of the teeth of the internal and external gears 31, 24 are denoted by $n1$ and $n2$ respectively, the internal gear 31 is delayed by an angle of $[360°(n1-n2)/n2]$ relatively to the external gear 24 while the external gear revolves once, the reduction ratio being equal to $(n1-n2)/n2$.

The diameter of the standard pitch circle of each gear is determined depending upon the module and the number of the teeth thereof, the number of the teeth of which can be determined so as to obtain a desired reduction ratio on condition that the difference in the diameter of the gears 24, 31 is required to be more than twice as long as the dimension of the addendum of the gears. The eccentric radius of the eccentric shaft portion 22a is equal to the difference in the radius of the standard pitch circle of the two gears 24, 31.

The internal gear 31 is provided with an integrally formed torque transmission part 32, which is rotatably carried by a support 21c protruding inwardly of the first casing 21a. The numeral 33 designates a cylindrical rotary member, and its middle portion is rotatably supported by the support 21c with its outer peripheral surface 33a contacting therewith, while its upper portion being keyed to the torque transmission part 32 (or connected to the same with splines or the like provided on the inner peripheral surface of the same and on the outer peripheral surface 33b of the upper portion), thereby permitting the torque produced to be transmitted from the latter to the former.

The inner peripheral surface 33c of the rotary member 33 conforms to a shape of the upper end of the valve stem 14 which is formed in a prism, so that the prism section 14a is fitted into the rotary member 33. That is, the rotary member 33, connected to the valve stem 14, acts not only as an output shaft, but it also serves to transmit the power to the valve stem as a joint.

The lower portion of the rotary member 33 is provided with two outwardly-extending projections 35, 35, and the lower portion of the first casing 21a is provided on its inner peripheral surface with two stop members 36, 36 each for contacting the corresponding projection 35. Each of the stop members 36, 36, which comprises an adjustable screw threadedly engaged with the first casing 21a, is adapted to touch the corresponding projection 35, thereby permitting the rotary member 33 to be stopped rotating. A position where the projections are stopped is changeable by advancing or loosening the stop member.

It is necessary to provide two projections and two stop members, since one projection and one stop member constituting a pair may be used for fully opening the valve, while the other pair for tightly closing the same. In a butterfly valve, the valve member is required to rotate through 90°, and the positions of the projections and the stop members, therefore, are determined so that the rotary member 33 may be rotated through 90°.

There is provided a bearing member 38 which is fitted to the upper end of the rotary member 33, and which rotatably supports the lower end of the input shaft 22. The bearing member 38 resists the downward thrust of the input shaft 22, and it also serves to prevent dislodgement of the external gear 24 through an aid of the guide bearing 23.

There is provided an annular groove 34 on the upper end face of the first casing 21a, into which is fitted an O-ring 39 to provide a seal between the first and the second casings 21a, 21b. Further, the second casing 21b is provided on the hole-defining surface, the input shaft passing through said hole, with an annular groove 40, into which is fitted an O-ring 41 to provide a seal between the second casing 21b and the input shaft. Still further, the support 21c of the first casing 21a is provided with an annular groove 42, into which is fitted an O-ring 43 to provide a seal between the first casing 21a and the rotary member 33.

The numeral 45 designates a handle mounted on a prism section 22b of the upper end of the input shaft.

Figure 5:
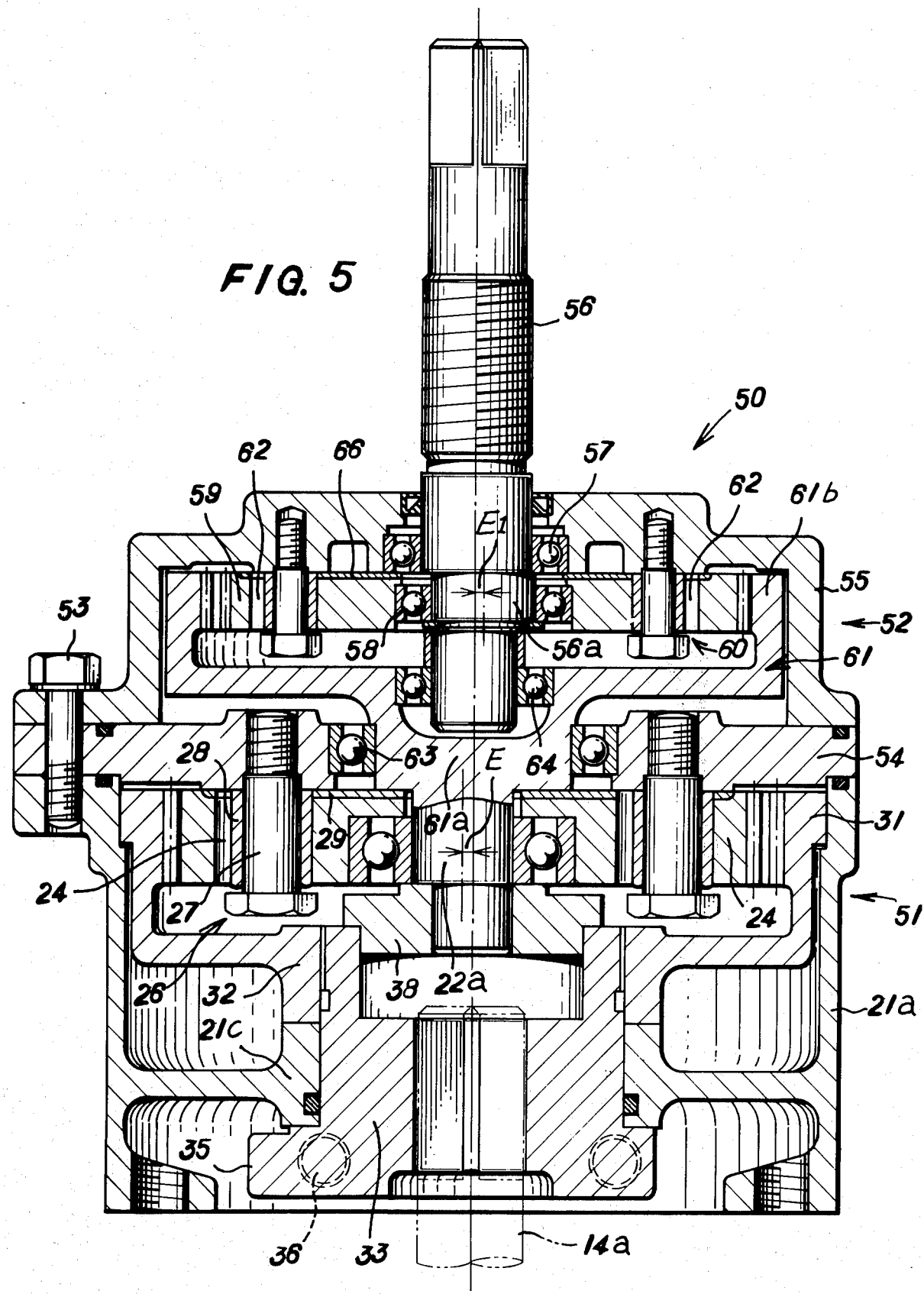
FIG. 5 is a longitudinal sectional view of a second embodiment of a reduction apparatus according to the present invention, installed on a valve.

Referring now to FIG. 5, there is shown a second embodiment of the present invention, i.e., a two-step reduction apparatus 50 for reducing the rotational speed of the input shaft in two steps. The two-step reduction apparatus, including the main components of the reduction apparatus 10, is based upon the same principle as the reduction apparatus 10.

The two-step reduction apparatus 50 comprises a second-step reduction mechanism 51 which is substantially the same as the reduction apparatus 10 with the input shaft 22 and the second casing 21b removed, and a first-step reduction mechanism 52 disposed thereon. As mentioned above, the second-step reduction mechanism 51 is substantially the same as the reduction apparatus 10, and its explanation, therefore, is omitted and the same reference numerals refer to like parts as in the reduction apparatus 10.

To the first casing 21a is fixed an intermediate casing 54 by means of a plurality of bolts, on which is fixedly disposed the second casing 55.

The first-step reduction mechanism 52 mainly comprises an input shaft 56, an external gear 59, pin assemblies 60 and an internal gear shaft 61. The input shaft 56, which is rotatably supported by the second casing 55 through an aid of a guide bearing 57, includes an eccentric shaft portion 56a which is positioned in the interior of the casing and on which is rotatably mounted the external gear 59 through a medium of a guide bearing 58, said eccentric shaft portion 56a being eccentric by E.

The external gear 59 is provided with a plurality of equally spaced through ports 62, into each of which is inserted the pin assemblies 60 fixed to the second casing 55 respectively. The eccentric portion 56a, the external gear 59, the through ports 62 and the pin assemblies 60 are related to each other substantially in the same manner as those of said reduction apparatus 10. Further, each pin assembly also comprises a pin and a cylindrical member.

Located outside the external gear 59 is the internal gear shaft 61 having teeth of the same module as those of the external gear 59, for engaging the same. The internal gear shaft 61 consists of an input shaft portion 61a functioning as an input shaft of the second-step reduction mechanism 51 and an internal ear 61b capable of engaging the external gear 59, which are formed integrally with each other. The input shaft portion 61a includes an eccentric shaft portion 22a which is the same as that of the input shaft 22 of the reduction apparatus 10 shown in FIG. 2, and which is rotatably supported through a medium of a guide bearing 63 by the intermediate casing 54 to which are secured pin assemblies 26 of the second-step reduction mechanism 51.

A slight clearance is provided between the outer peripheral surface of the internal gear 61b and the inner peripheral surface of the second casing 55, which are opposite to each other. The lower end of the input shaft 56 is fitted to the input shaft portion 61a, said input shaft 56 and said input shaft portion being rotatable through a guide bearing 64 relatively to each other. The guide bearing 64 is preferably a thrust bearing. The input shaft 56, the input shaft portion 61a and the rotary member 33 are positioned coaxially with each other. The external gear 59 is provided on its upper surface with an antifriction plate 66. The internal gear 61b is disposed so as to leave a slight clearance between its upper and outer peripheral surfaces and the inner peripheral surface of the second casing 55.

The reduction ratio of the first-step reduction mechanism 52 is determined depending upon the ratio of the number of teeth of the external gear 59 to that of the internal gear of the internal gear shaft 61, while the reduction ratio of the second-step reduction mechanism 51 depending upon the ratio of the number of teeth of the external gear 24 to that of the internal gear 31, the reduction ratios of said both mechanisms deciding the reduction ratio of the two-step reduction apparatus 50. Even if the two-step reduction apparatus 50 is used for driving a large-sized butterfly valve which requires high torque to rotate the valve stem 14 thereof, it can be easily driven manually or by a motor of less power. Furthermore, since the main components of the second-step reduction mechanism 51 are the same as those of the one-step reduction apparatus 10, the second-step reduction mechanism 51 can be applied to one-step or two-step reduction apparatus.

What is claimed is:

1. A reduction apparatus for opening and closing a valve, the valve comprising a valve body having an inner circumferential surface, a valve seat fixed to the inner circumferential surface of the valve body, a valve stem extending through the valve body and the valve seat and rotatably supported by the valve body, the valve stem having an outer end extending outwardly beyond the valve body and an inner end extending inwardly beyond the valve body, and a disc-shaped valve member mounted on said inner end of the valve stem for controlling fluid flow through the valve body, the reduction apparatus comprising:

a first casing mounted on the valve body, a second casing mounted on the first casing, an input shaft extending rotatably through said second casing, the input shaft including an eccentric shaft portion positioned inwardly of said second casing, an external gear having a central opening through which said eccentric shaft portion extends, a bearing between said eccentric shaft portion and the surface of said central opening of the external gear, said external gear having a plurality of ports extending therethrough radially outwardly of said central opening, a pin assembly positioned within each of said ports in said external gear, each pin assembly comprising a pin secured to said second casing and a cylindrical sleeve formed of antifriction material surrounding the pin and engageable with the surface of the port, the radius of each of said ports being equal to the sum of the outer radius of said cylindrical sleeve and the eccentricity of said eccentric shaft portion relative to said input shaft, an internal gear rotatably supported by the inner surface of said first casing and engaging said external gear, said internal gear having a larger number of teeth than said external gear, said first casing having a supporting portion extending radially inwardly toward the axis of said input shaft and having a central opening therein, a rotary member rotatably supported within said central opening of the supporting portion of the first casing and non-rotatably connected to said internal gear and to said outer end of said valve stem for transmitting torque from the internal gear to the valve stem, the rotary member including at least one radially outwardly extending projection, a stop member adjustably mounted on the inner surface of said first casing engageable with said projection on said rotary member for limiting rotation of said rotary member, the stop member being adjustable to vary the amount of rotation of the rotary member, and a bearing between said rotary member and said input shaft for rotatably supporting said input shaft and said bearing between said eccentric shaft portion and said external gear.

2. A reduction apparatus for opening and closing a valve, the valve comprising a valve body having an inner circumferential surface, a valve seat fixed to the inner circumferential surface of the valve body, a valve stem extending through the valve body and the valve seat and rotatably supported by the valve body, the valve stem having an outer end extending outwardly beyond the valve body and an inner end extending inwardly beyond the valve body, and a disc-shaped valve member mounted on said inner end of the valve stem for controlling fluid flow through the valve body, the reduction apparatus comprising:

- a first casing mounted on the valve body,
- an intermediate casing mounted on the first casing and having a central opening,
- a second casing mounted on the intermediate casing,
- an input shaft extending rotatably through said second casing, the input shaft including an eccentric shaft portion positioned inwardly of said second casing,
- an external gear having a central opening through which said eccentric shaft portion extends,
- a bearing between said eccentric shaft portion and the surface of said central opening of the external gear,
- said external gear having a plurality of ports extending therethrough radially outwardly of said central opening,
- a pin assembly positioned within each of said ports in said external gear, each pin assembly comprising a pin secured to said second casing and a cylindrical sleeve formed of antifriction material surrounding the pin and engageable with the surface of the port, the radius of each of said ports being equal to the sum of the outer radius of said cylindrical sleeve and the eccentricity of said eccentric shaft portion relative to said input shaft,
- an internal gear between said second and intermediate casings and having a shaft portion extending through said central opening of the intermediate casing,
- a bearing between said shaft portion of the internal gear and said central opening of the intermediate casing for rotatably supporting the intermediate gear,
- said shaft portion of said internal gear including a second eccentric shaft portion,
- a second external gear having a central opening through which said second eccentric shaft portion extends,
- a bearing between said second eccentric shaft portion and the surface of said central opening of said second external gear,
- said second external gear having a plurality of ports extending therethrough radially outwardly of said central opening thereof,
- a pin assembly positioned within each of said ports in said second external gear, each pin assembly comprising a pin secured to said intermediate casing and a cylindrical sleeve formed of antifriction material surrounding the pin and engageable with the surface of the port, the radius of each of said ports being equal to the sum of the outer radius of said cylindrical sleeve and the eccentricity of said second eccentric shaft portion relative to said shaft portion of said internal gear,
- a second internal gear rotatably supported by the inner surface of said first casing and engaging said second external gear, said second internal gear having a larger number of teeth than said second external gear, said first casing having a supporting portion extending radially inwardly toward the axis of said shaft portion of said internal gear and having a central opening therein,
- a rotary member rotatably supported within aid central opening of the supporting portion of the first casing and non-rotatably connected to said second internal gear and to said outer end of said valve stem for transmitting torque from said second internal gear to the valve stem, the rotary member including at least one radially outwardly extending projection,
- a stop member adjustably mounted on the inner surface of said first casing engageable with said projection on said rotary member for limiting rotation of said rotary member, the stop member being adjustable to vary the amount of rotation of the rotary member, and
- a bearing between said rotary member and said shaft portion of said internal gear for rotatably supporting said shaft portion of said internal gear and said bearing between said second eccentric shaft portion and said second external gear.

* * * * *